(12) United States Patent
Saenger et al.

(10) Patent No.: US 8,642,944 B2
(45) Date of Patent: Feb. 4, 2014

(54) DOWNHOLE TOOLS WITH SOLID-STATE NEUTRON MONITORS

(75) Inventors: Richard Saenger, Chatillon (FR); Bradley A. Roscoe, Ridgefield, CT (US); Zilu Zhou, Needham, MA (US); Christian Stoller, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/848,473

(22) Filed: Aug. 31, 2007

(65) Prior Publication Data
US 2009/0057545 A1  Mar. 5, 2009

(51) Int. Cl.
*G01V 5/10* (2006.01)

(52) U.S. Cl.
USPC ............ 250/269.4; 250/390.01; 250/269.2; 250/390.1

(58) Field of Classification Search
USPC ................ 250/390.01, 269.4, 269.2, 390.1
See application file for complete search history.

(56) References Cited

U.S. PATENT DOCUMENTS

| | | | |
|---|---|---|---|
| 4,661,700 A * | 4/1987 | Holenka | 250/267 |
| 4,760,252 A * | 7/1988 | Albats et al. | 250/390.07 |
| 5,097,133 A | 3/1992 | Nam et al. | |
| 5,216,249 A * | 6/1993 | Jones et al. | 250/370.05 |
| RE36,012 E | 12/1998 | Loomis et al. | |
| 5,854,506 A | 12/1998 | Fallica | |
| 5,940,460 A * | 8/1999 | Seidel et al. | 376/153 |
| 6,032,102 A | 2/2000 | Wijeyesekera et al. | |
| 6,166,365 A | 12/2000 | Simonetti et al. | |
| 6,495,837 B2 | 12/2002 | Odom et al. | |
| 6,639,210 B2 | 10/2003 | Odom et al. | |
| 6,754,586 B1 | 6/2004 | Adolph et al. | |

(Continued)

FOREIGN PATENT DOCUMENTS

| | | |
|---|---|---|
| CN | 2570511 | 9/2003 |
| CN | 2570811 Y | 9/2003 |

(Continued)

OTHER PUBLICATIONS

Ha et al.,A self-biased neutron detector based on an SiC semiconductor, (2009) Applied Radiatio and Isotopes , 67, 1204-1207.*

(Continued)

*Primary Examiner* — David Porta
*Assistant Examiner* — Djura Malevic
(74) *Attorney, Agent, or Firm* — Jeremy Berman

(57) ABSTRACT

A nuclear tool includes a tool housing; a neutron generator disposed in the tool housing; and a solid-state neutron monitor disposed proximate the neutron generator for monitoring the output of the neutron generator. A method for constructing a nuclear tool includes disposing a neutron generator in a tool housing; and disposing a solid-state neutron monitor proximate the neutron generator for monitoring the output of the neutron generator. A method for logging a formation includes disposing a nuclear tool in a wellbore penetrating the formation, wherein the nuclear tool comprises a neutron generator and a solid-state neutron monitor disposed proximate the neutron generator; generating neutrons from the neutron generator; monitoring neutrons generated by the neutron generator using the solid-state neutron monitor; detecting signals generated from the neutrons traveling in the formation; and correcting the detected signals, based on signal strength detected by the solid-state neutron monitor, to produce corrected signals.

11 Claims, 11 Drawing Sheets

(56) References Cited

U.S. PATENT DOCUMENTS

| | | | |
|---|---|---|---|
| 6,884,994 B2 * | 4/2005 | Simonetti et al. | 250/269.4 |
| 7,148,471 B2 * | 12/2006 | Roscoe et al. | 250/269.2 |
| 7,375,343 B1 * | 5/2008 | Cook et al. | 250/390.01 |
| 2003/0107003 A1 | 6/2003 | Whitehead | |
| 2005/0012044 A1 | 1/2005 | Tadokoro | |
| 2005/0220247 A1 * | 10/2005 | Ruddy et al. | 376/159 |
| 2006/0226351 A1 | 10/2006 | Stoller et al. | |

FOREIGN PATENT DOCUMENTS

| | | |
|---|---|---|
| GB | 1205115 | 9/1970 |
| GB | 1276079 | 6/1972 |
| WO | 2006073438 | 7/2006 |

OTHER PUBLICATIONS

Ruddy et al., The Fast Neutron Response of 4H Silicon Carbide Semiconductro Radiation Detectors, Jun. 2006,IEEE Transactions on Nuclear Science, vol. 53 No. 3, 1666-1670.*

Ruddy et al., Development of a Silicond Carbide Radiation Detector, Jun. 1998, IEEE Transactions on Nuclear Science, vol. 45, No. 3, 536-541.*

Maqueda et al., Proton recoil detector of fusioin neutrons using natural diamond, Jan. 1997, Rev. Sci. Instrum, 68 (1), 624-627.*

Schmid et al., A neutron sensor based on single crystal CVD diamond, 2004, Nuclear Instruments and Methods in Physics Research, A 527, pp. 554-561.*

Ruddy et al.,The Fast Neutron Response of 4H silicon Carbide Semiconductor Radiation Detectors,Jun. 2006, IEEE Transactions on Nuclear Science, vol. 53, No. 3, pp. 1666-1670.*

Dulloo, Abdul R. et al, Monitoring of D-T Accelerator Neutron Output in a PGNAA System Using Silicon Carbine Detectors, Science & Technology Department, Westinghouse Electric Company, XP008107654, 2001 American Institute of Physics, pp. 499-503.

International Search Report and Written Opinion dated May 7, 2009 for PCT/US2008/073228.

Balducci, A. et al., "Growth and characterization of single crystal CVD diamond film based nuclear detectors", Diamond & Related materials 15 (2006) 292-295.

Author Unknown, "Silicon carbide opens the door to radiation-detection market", Feb. 9, 2005, www.compoundsemiconductor.net.

Alekseev, A.G. et al.,"Fast X-ray and Neutron Detectors Based on Natural Diamond", Instruments and Experimental Techniques, vol. 47, No. 2, (2004) 153-156.

Kovalchuk, V.D. et al., "Diamond detector as a fast neutron spectrometer" Nuclear Instruments and Methods in Physics Research, A 351 (1994) 590-591.

* cited by examiner

DOWNHOLE TOOLS WITH SOLID-STATE NEUTRON MONITORS

BACKGROUND OF INVENTION

1. Field of Invention

This invention relates tools for the determination of formation properties; particularly, this invention relates to nuclear tools having neutron generators and neutron monitors.

2. Background Art

In hydrocarbon exploration and production, it is important to determine whether an earth formation contains hydrocarbon and how much hydrocarbon is in the formation. Underground hydrocarbons, as well as water, are typically contained in pore space in the formations. Neutron "porosity" tools are traditionally used to determine the amount of hydrocarbon and water present in pore spaces of earth formations because of their unique abilities to detect such fluids.

A neutron tool contains a neutron-emitting source (either a chemical source or a neutron generator) and one or more axially spaced detectors that respond to the flux of impinging neutrons or gamma-rays resulting from the interactions of neutrons with nuclei within the borehole and formation in the vicinity of the borehole. The basic concept of a neutron porosity tool is predicated on the fact that (a) hydrogen is the most effective moderator of neutrons and that (b) most hydrogen found in earth formations is contained in liquid in the pore space of the formation, either as water or as liquid hydrocarbon or gas. For neutrons emitted with a fixed energy by the source, the count rates recorded by the detectors typically decrease as the volumetric concentration of hydrogen (e.g., porosity) increases.

FIG. 1 shows a simplified schematic illustrating a wireline neutron logging operation. As shown in FIG. 1, a neutron tool 11 is disposed in a wellbore 12. The neutron tool 11 includes a neutron source 13 and one or more neutron detectors 14. The neutron source, which may be a chemical source or an electronic neutron generator, emits neutrons into the formation 15 surrounding the wellbore 12. The emitted neutrons traverse the formation 15 and interact with matter in the formation. As a result of such interactions, the neutrons lose some of their energy. Consequently, the neutrons may arrive at the detector 14 with lower energies. By analyzing the response of the detectors to these neutrons, it is possible to deduce the properties of the surrounding formations.

Traditional neutron tools with chemical sources are able to measure the porosity of a formation in the form of a thermal neutron porosity reading. The chemical source typically relies on α-beryllium reactions in a $^{241}$Am-Be mixture. The interaction of the alpha particle with the Beryllium results in the release of a neutron. The average energy of the emitted neutrons is about 4 MeV. These high-energy neutrons interact with nuclei in the formation and become slowed mainly by elastic scattering to near thermal energies. The slowing-down process is dominated by hydrogen. At thermal energies, the neutrons diffuse through the material until they undergo thermal capture. Capture is dominated by hydrogen and thermal neutron absorbers, such as chlorine or iron.

FIG. 2A shows one example of a chemical source neutron tool (e.g., CNL® from Schlumberger Technology Corp., Houston. Tex.). As shown in FIG. 2A, the chemical source neutron tool 120 includes a chemical source 125, which includes a radioactive material, such as AmBe. The chemical source neutron tool 120 also includes a near detector 124 and a far detector 122 to provide a countrate ratio, which is used to calculate the porosity of a formation. The near detector 124 and far detector 122 are thermal detectors. In addition, the tool 120 includes shielding materials 123 that prevent the neutrons generated by the chemical sources from directly reaching the detectors, minimizing the interference from the neutron source 125.

Neutron tools using chemical sources have been around for a long time. As a result, users are more familiar with the thermal neutron porosity measurement acquired with chemical source neutron tools. In addition, petrophysicists typically use thermal neutron porosity for specific minerals as part of their formation analysis. However, chemical sources are less desirable due to their constant emission of radiation and strict government regulations. In addition, the material for many of these chemical sources is becoming scarce. Therefore, there is a need to develop neutron tools that do not rely on chemical sources.

In response to the desire to move away from chemical source neutron tools, some modern neutron tools have been equipped with electronic neutron sources, or neutron generators (minitrons). Neutron generators contain compact linear accelerators and produce neutrons by fusing hydrogen isotopes together. The fusion occurs in these devices by accelerating either deuterium ($^2$H=D) or tritium ($^3$H=T), or a mixture of these two isotopes, into a metal hydride target, which also contains either deuterium ($^2$H) or tritium ($^3$H), or a mixture of these two isotopes. In about 50% of the cases, fusion of deuterium nuclei (d+D) results in the formation of a $^3$He ion and a neutron with a kinetic energy of approximately 2.4 MeV. Fusion of a deuterium and a tritium atom (d+T) results in the formation of a $^4$He ion and a neutron with a kinetic energy of approximately 14.1 MeV.

These neutrons, when emitted into formations, interact with matter in the formations and gradually lose energy. This process is referred to as slowing down. The slowing-down process is generally dominated by the elastic scattering of neutrons by hydrogen nuclei, and is characterized by a slowing-down length. Eventually, the high-energy neutrons are slowed down enough to become epithermal neutrons or thermal neutrons. Thermal neutrons typically have an average kinetic energy of 0.025 eV at room temperature, while epithermal neutrons typically have energies corresponding to kinetic energies in the range of 0.4-10 eV. However, neutrons with energies as high as 1 keV may be considered epithermal. One of ordinary skill in the art would appreciate that these energy ranges are general guidelines, rather than clear-cut demarcations. The slowed-down neutrons are typically detected by detectors in the tools, which may include fast neutron detectors, epithermal neutron detectors, and thermal neutron detectors.

FIG. 2B shows one example of an electronic source neutron tool (e.g., APS® from Schlumberger Technology Corp., Houston, Tex.). Examples of such tools can be found in U.S. Pat. No. 6,032,102 issued to Wijeyesekera et al., and in U.S. Pat. No. Re. 36,012 issued to Loomis et al. These patents are assigned to the present assignee and are incorporated by reference in their entirety. As shown in FIG. 2B, the electronic source neutron tool 121 uses an electronic neutron source to produce high-energy (e.g., 2.4 or 14 MeV) neutrons. The high-energy neutrons emitted into formations are slowed to epithermal and thermal energies by interactions with matter (nuclei) in the formations. The epithermal or thermal neutrons are detected by detectors on the neutron tool 121, such as near detector 126, array detector 127, and far detector 129. By measuring epithermal neutrons, the detector responses are primarily dominated by the hydrogen content in the formation, without complication from neutron absorbers. Thus, the electronic neutron tool 121 may conveniently provide measurements for hydrogen index. In addition, the neutron tool 121 may also include an array thermal detector 128 to detect thermal neutrons that returned from the formation. The epithermal neutron and thermal neutron measurements obtained with this tool can be used to derive various formation parameters.

Between the chemical source and the electronic source, the chemical source has the advantage of having a stable and predictable neutron output. The change of their neutron output is dominated by the half-life of the primary alpha source used to generate the nuclear reaction. Given the half-life of the alpha sources typically used (e.g., $^{241}$Am: $T_{1/2}$=430 yrs), it is sufficient to determine or verify the neutron output at intervals of several months.

In contrast, the neutron output of an electronic source varies over time due to internal effects in the electronic source and its power supplies. In addition, the neutron output of an electronic source is also influenced by external factors, such as temperature, shock, and vibration. If an electronic neutron source is to be used for absolute measurements, it is necessary to have a device that monitors its instantaneous output.

The need for neutron monitors has been recognized in the past. At present, downhole neutron monitors rely exclusively on scintillation detectors, in particular plastic detectors, for neutron output monitoring. These monitors rely on the proton recoil following elastic neutron scattering in the organic scintillator. Such technologies are described in U.S. Pat. Nos. 6,166,365 and 6,884,994 issued to, both of which are issued to Simonetti et al. and U.S. Pat. Nos. 6,495,837 and 6,639, 210, both of which are issued to Odom et al. See also, U.S. Pat. No. 6,754,586, issued to Adolph et al., which discloses monitors for use to calibrate the outputs of electronic neutron sources.

While the prior art scintillation type monitors provide accurate monitoring of neutron outputs form electronic neutron generators, there remains a need for better monitors.

SUMMARY OF INVENTION

One aspect of the invention relates to nuclear tools. A nuclear tool in accordance with one embodiment of the invention includes a tool housing configured to move in a wellbore penetrating a formation; a neutron generator disposed in the tool housing; and a solid-state neutron monitor disposed proximate the neutron generator for monitoring outputs of the neutron generator.

Another aspect of the invention relates to methods for constructing a nuclear tool. A method in accordance with one embodiment of the invention includes disposing a neutron generator in a tool housing; and disposing a solid-state neutron monitor proximate the neutron generator for monitoring outputs of the neutron generator.

Another aspect of the invention relates to methods for logging a formation. A method in accordance with one embodiment of the invention includes disposing a nuclear tool in a wellbore penetrating the formation, wherein the nuclear tool comprises a neutron generator and a solid-state neutron monitor disposed proximate the neutron generator; generating neutrons from the neutron generator; monitoring neutrons generated by the neutron generator using the solid-state neutron monitor; detecting signals generated from the neutrons traveling in the formation; and correcting the detected signals, based on signal strength detected by the solid-state neutron monitor, to produce corrected signals.

Other aspects and advantages of the invention will be apparent from the following description and the appended claims.

DETAILED DESCRIPTION

Embodiments of the invention relate to solid-state detectors for monitoring neutron outputs and tools having an electronic neutron source and such a monitor. The small size of a solid-state monitor allows for easier integration of the solid-state neutron monitor with a neutron generator.

Conventionally, neutron output monitors (or neutron monitors) used in neutron logging tools rely on plastic scintillation crystals to convert neutron energies into photons. See for example, U.S. Patent Application Publication No. 2006/0226351 by Stoller et al. These materials respond to neutron radiation passing through them by producing light. These light signals are then converted into electrical signals by photomultipliers.

Figure 1:
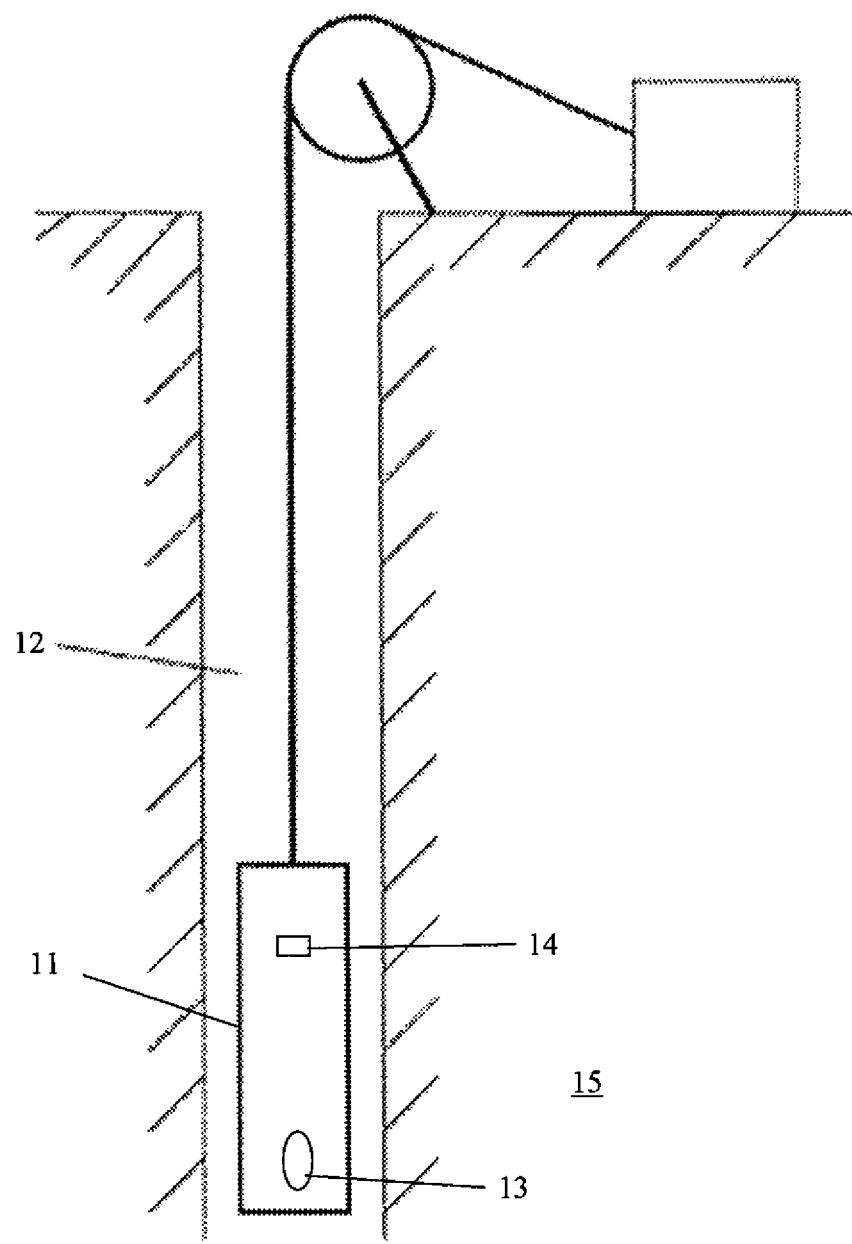
FIG. 1 shows a conventional nuclear logging tool disposed in a wellbore.
Figure 2:
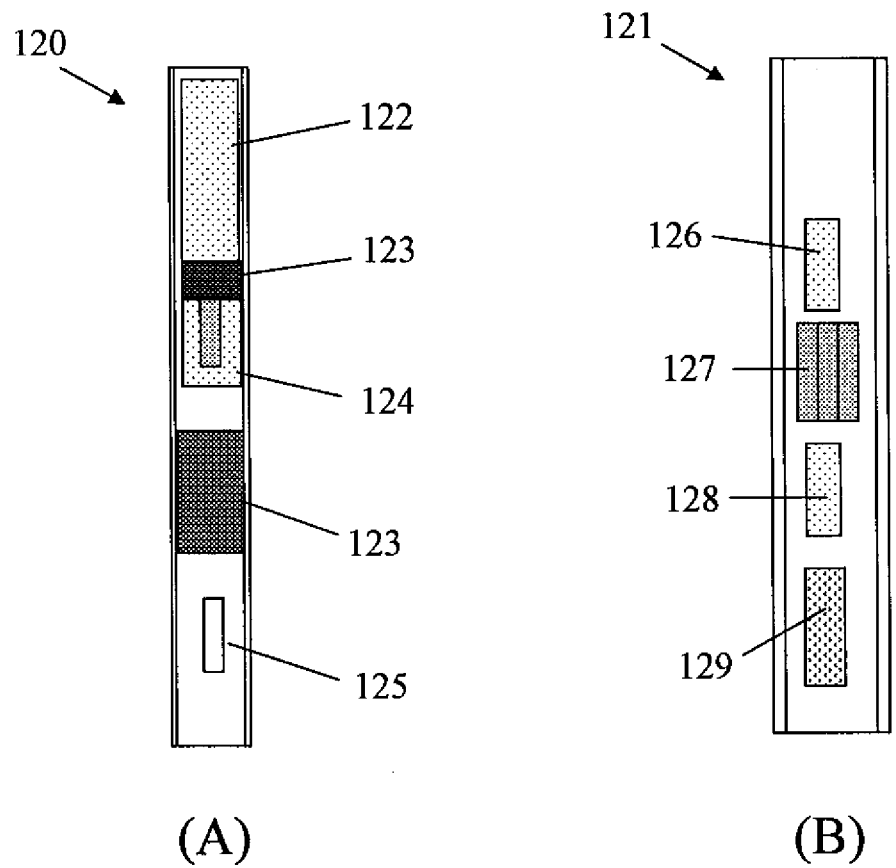
FIGS. 2A and 2B show two schematics representing a conventional chemical source neutron tool and a conventional electronic source neutron tool, respectively.
Figure 3A:
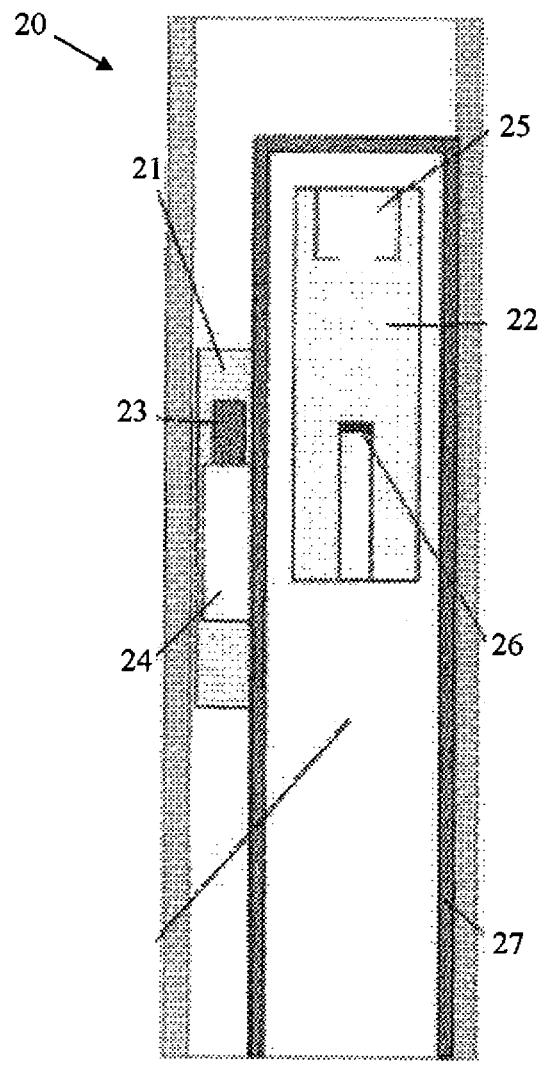
FIGS. 3A and 3B show two configurations of conventional scintillation monitors used in electronic source neutron tools.

FIG. 3A shows a prior art neutron tool 20 that includes a neutron monitor 21 disposed near the electronic neutron generator 22. The neutron monitor 21 comprises a scintillator crystal 23 and a photomultiplier 24. The electronic neutron generator comprises an ion source 25 and a target 26. The neutron monitor 21 (i.e., scintillator crystal 23 and photomultiplier 24) is attached to the neutron tool 20 radially from the target 26 outside of the generator housing 27. The neutron monitor 21 is disposed as close as possible to the target 26 in order to get sufficient counts for a high precision measurement and minimize the contribution from indirect (scattered) neutron radiation.

With the addition of a scintillator and photomultiplier, the diameter of the tool is typically increased by about 20 mm, which is a substantial increase in view of the limited dimension of the tool. The relatively large sizes of such conventional neutron monitors make it difficult to use them in small diameter tools. One alternative is to place such neutron monitors at the ends of neutron generators, instead of on the side.

Figure 3B:
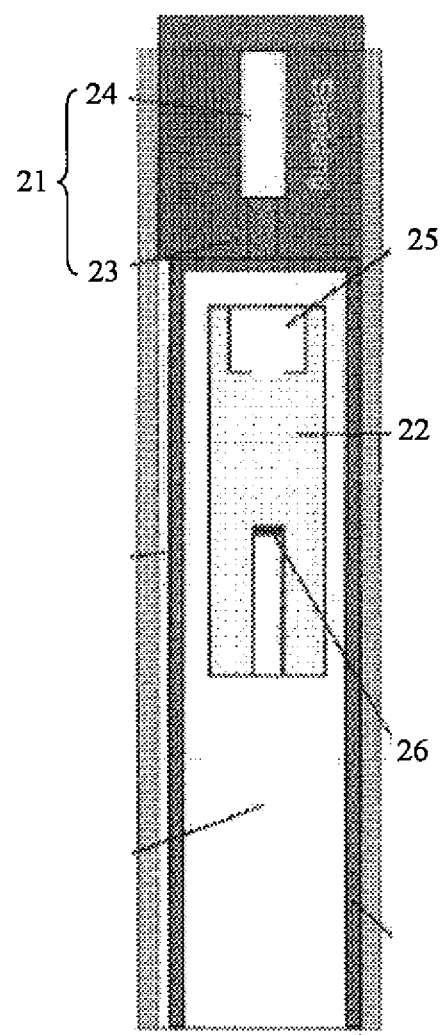

As shown in FIG. 3B, the neutron monitor 21 is disposed axially from the neutron generator 22—at one end of the neutron generator. Furthermore, the scintillator crystal 23 is disposed as close as possible to the neutron generator 22 in order to increase the sensitivity of the neutron monitor 21. Although this arrangement avoids the limitation of the small housing inner diameter, this puts the neutron monitor 21 at a larger distance from the target 26, which leads to a significant decrease in the monitor count rates. This deteriorates accuracy and precision of the measurement. Furthermore, this may interfere with the shielding material that is typically disposed at the end of the neutron generator 22.

Figure 4:
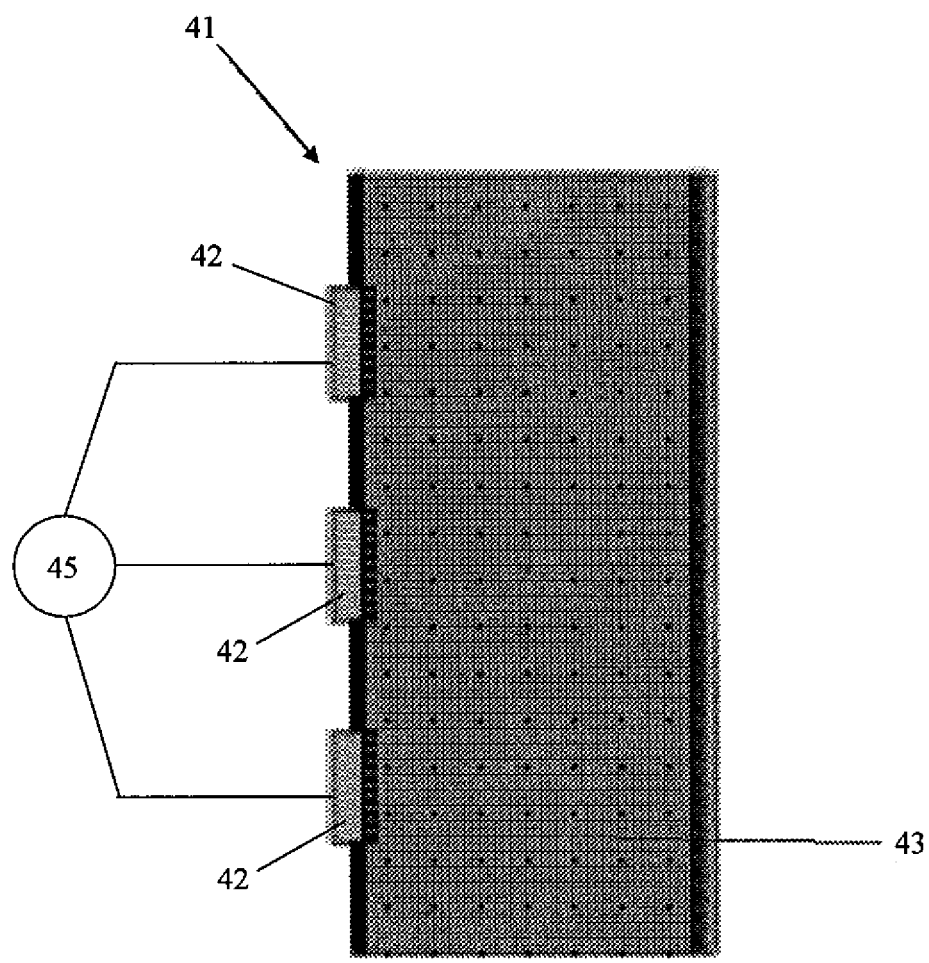
FIG. 4 shows a schematic illustrating a solid state detector for use in neutron output monitoring in accordance with one embodiment of the invention.

To avoid the bulkiness problem associated with the conventional neutron monitors, embodiments of the invention use small solid-state neutron monitors. Solid-state neutron monitors of the invention are characterized as having small sizes, such as between 0.5 and about 2 cm (preferably about 1 cm) in diameter and about 0.1 to about 1 cm (preferably about 0.1 mm to over 1.0 mm) thick. FIG. 4 illustrates one example of a solid-state neutron monitor (i.e., a semiconductor radiation detector) that may be used with embodiments of the invention. Examples of semiconductor detectors may be found in U.S. Pat. No. 5,854,506 issued to Fallica. Such solid-state monitors typically comprise carbon nuclei (e.g., in diamond or silicon carbide (SiC)) that react with the impinging radiation (e.g., neutron radiation).

Neutrons can interact with carbon nuclei in a solid-state neutron monitor in several different ways. Possible reactions between neutrons and carbon nuclei (found in a diamond detector or a SiC detector) include: (i) Elastic scattering on C-nuclei: $^{12}C$ (n, n') $^{12}C$; (ii) Inelastic interactions with the carbon nuclei; (iii) Inelastic neutron scattering: C (n, n') $^{12}C$; (iv) Inelastic reaction: $^{12}C$ (n, $\alpha$) $^9Be$; and (v) Inelastic reaction: $^{12}C$ (n, n') $3\alpha$.

Elastic and inelastic scatterings lead to a variety of recoil energies of the carbon nuclei, depending on the scattering angles. The maximum energy that can be transferred to the carbon nucleus in an elastic central collision with a 14 MeV neutron is about 1 MeV. In inelastic collision $^{12}C$ (n, $\alpha$) 9Be, the total amount of energy deposited in the detector is well defined, resulting in a spectral line. In contrast, elastic scattering and inelastic reactions $^{12}C$ (n, n') $3\alpha$ result in continuous spectra because the energies deposited in the carbon nuclei depend on kinematics of the collision, i.e., the neutron exiting the collision carries way a variable amount of energy depending on its scattering angle. Similar interactions occur with $^{28}Si$. The reaction that results in the creation of charged particles alone will generally lead to a line in the resulting monitor spectrum.

In addition to diamond and SiC noted above, other materials suitable for use in a solid state detector include silicon (Si). Although Si is among the most commonly used materials in solid state detectors, it has a small band gap and is not optimal for high temperature applications. At high temperatures such as those encountered in downhole environments, the best materials to use are those with large band gaps. Such large band gap materials, for example, include synthetic diamonds (e.g., polycrystalline diamond or homoepitaxial synthetic diamond, which has a band gap of 5.5 eV) or SiC. Relatively large homoepitaxial synthetic diamonds can now be produced by chemical vapor deposition (CVD) and are becoming preferred materials, as compared to the older polycrystalline diamonds.

As illustrated in FIG. 4, a semiconductor detector 41 comprises electrodes 42 and diamond (e.g., homoepitaxial synthetic diamond) 43. Radiation (e.g., neutrons) that impinges on the diamond 43 may move electrons into the conduction band of the diamond lattice. Once the electrons have been moved to the conduction band (and holes exist in the valence band), they will be able to produce a current when a potential difference is supplied across the detector. Thus, by monitoring the current intensity flowing between electrodes, one can deduce the amount of carbon excitation, which is then used as an indication of the amount of radiation.

While the simplest approach may be to measure the average current passing through the device, it is more useful to measure and count the single current pulses produced by neutrons interacting with the diamond. In particular, the use of a pulse-height spectrum offers a way to measure and control the gain of the device and to discriminate against undesired radiation. Such undesired radiation, for example, may include x-rays generated in the neutron generator vacuum tube (minitron) or gamma-rays induced by neutron interactions with the tool, borehole or formation.

While there may be various ways to count the radiation impinging on a solid state monitor or to analyze pulse-height spectrum, one simple example is to connect the monitor 41 to an outside circuit 45, which sets up a gate of an extremely short period. During this period, the circuit measures the amount of energy that passes through the detector. If the energy is above a certain threshold, this gate is counted as a one, if not it is counted as a 0. After a given duration, the total is summed to find a quantitative measurement for the amount of radiation passing through the semiconductor detector. Furthermore, one can vary the gain and/or threshold in such a circuit to perform pulse-height analysis, if so desired.

In accordance with embodiments of the invention, such solid-state radiation monitors may be incorporated into nuclear tools for downhole use. Due to their reduced sizes, such neutron monitors may be easily incorporated into a downhole nuclear tool in various configurations. FIGS. 5-9 illustrate some of possible configurations.

Figure 5:
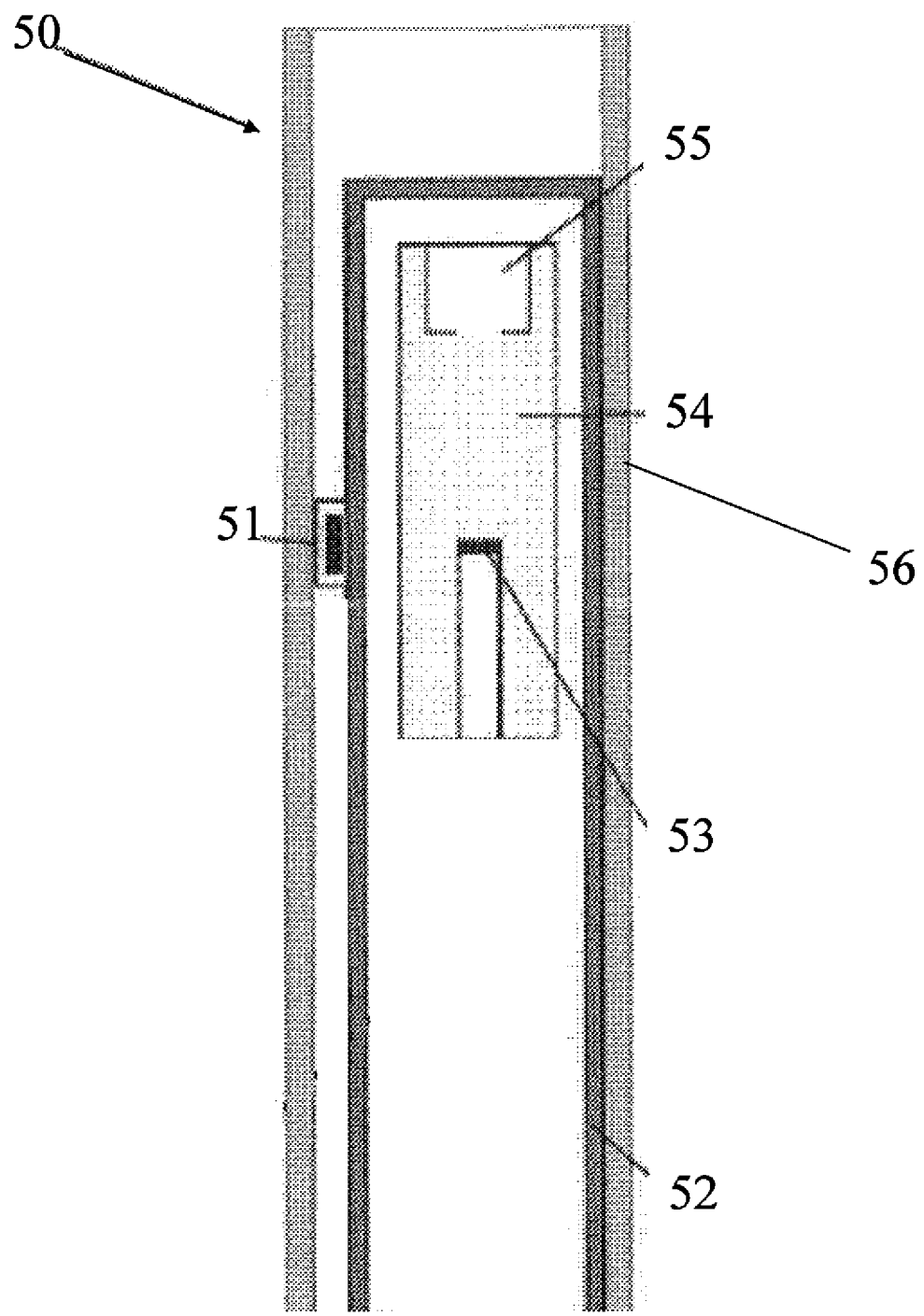
FIG. 5 shows a schematic of a nuclear tool having a solid-state neutron monitor in accordance with one embodiment of the invention.

FIG. 5 shows one embodiment of a solid state detector 51 used as a neutron monitor in a downhole tool 50. In this embodiment, the solid-state neutron monitor is mounted next to the neutron generator 54, which comprises an ion source 55 and a target 53. In this particular configuration, the neutron monitor 51 is mounted outside of the generator housing 52 radially from the target 53, but inside of the tool housing 56. Although this configuration is similar to the conventional tool shown in FIG. 3A, it takes up little inner space of the tool because of the small size of the solid-state neutron monitor. A typical solid-state neutron monitor may have a diameter on the order of 1 cm and a thickness on the order of 0.1 mm to 1 mm (or more, depending on the homoepitaxial growth). In general, thicker layer of diamond will result in increased numbers of counts, and it would also improve the spectral resolution because more of the neutron particles will be stopped. However, the thickness is often limited by the homoepitaxial growth process.

Figure 6:
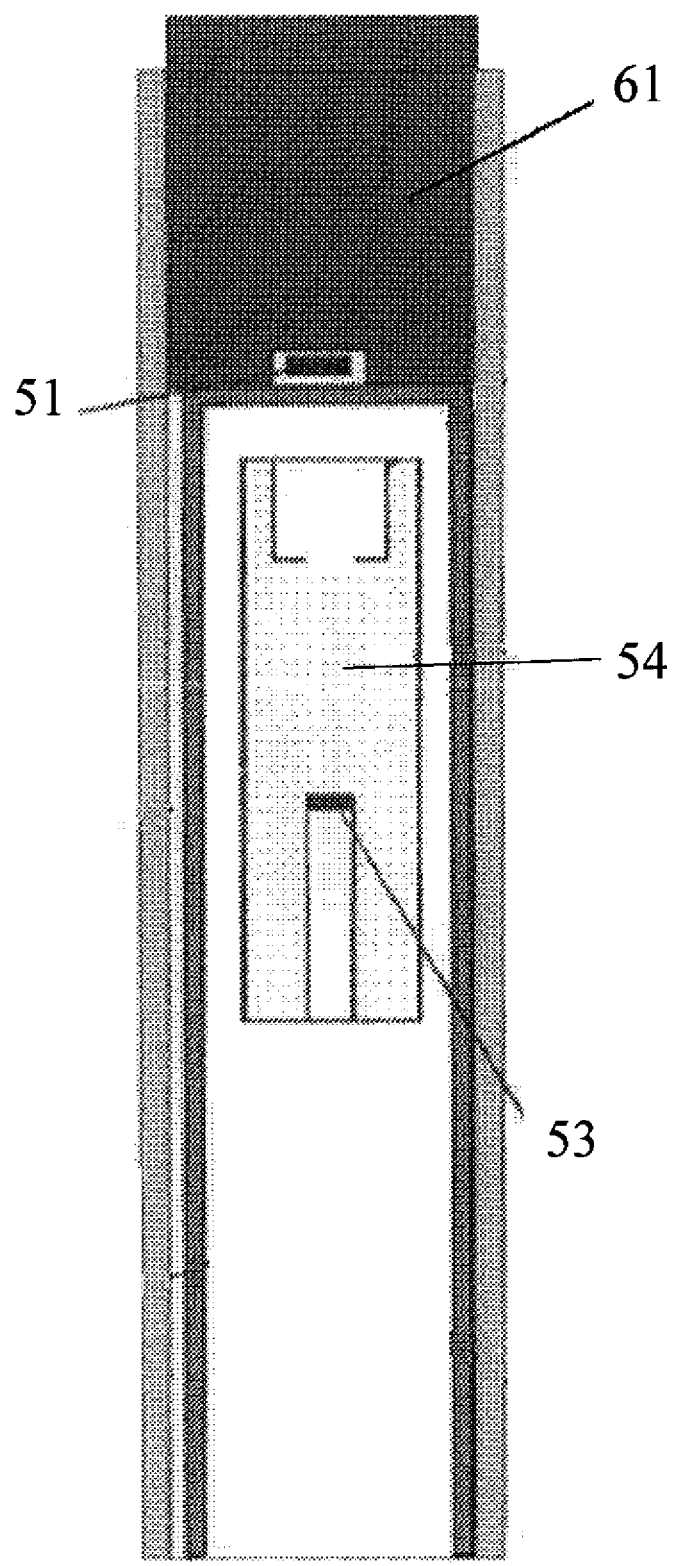
FIG. 6 shows another schematic of a nuclear tool having a solid-state neutron monitor in accordance with one embodiment of the invention.

The small size of a solid-state neutron monitor allows for flexible arrangement of the neutron monitor in the tool. FIG. 6 shows another embodiment of the invention, in which a solid state detector 51 is mounted axially at one end of the neutron generator 54. In this configuration, the neutron monitor 51 is farther from the target 53, which might result in a slight decrease in the count rates. However, due to its small size, the solid state detector 51 would take up only a small space that is typically reserved for shielding materials 61. Therefore, the placement of the neutron monitor 51 at this location would have little impact on the placement of shielding material 61. This in turn will result in significant improvements in the measurement performance of the shielded detectors. As noted above in FIG. 3B, with the conventional scintillator crystal and photomultiplier, because of its larger size, this arrangement will significantly interfere with the placement of shielding materials, leading to less precise measurements.

Figure 7:
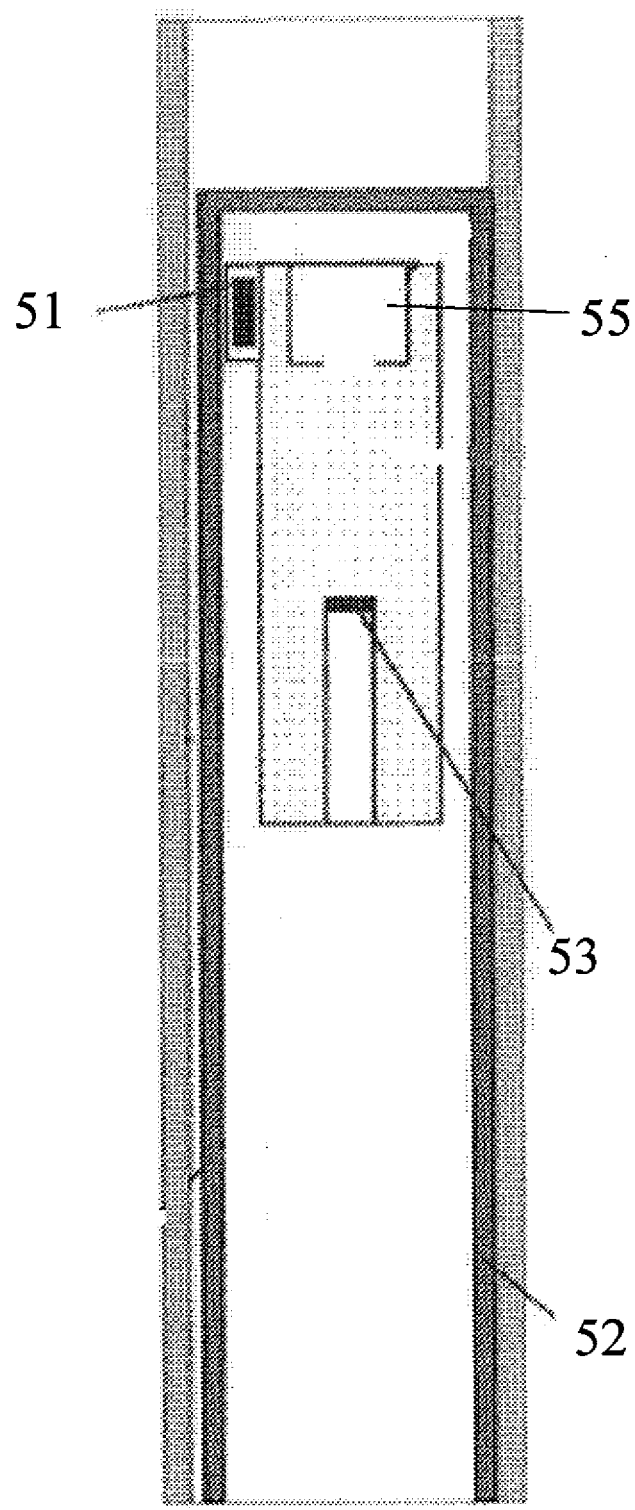
FIG. 7 shows another schematic of a nuclear tool having a solid-state neutron monitor in accordance with one embodiment of the invention.

FIG. 7 shows another embodiment of the invention, in which the small size solid-state detector 51 is disposed inside the neutron generator housing 52. This would have been difficult to achieve with the larger scintillation crystal detector and a photomultiplier and would have required an impractically large generator housing diameter. In the configuration shown in FIG. 7, the neutron monitor 51 is disposed proximate the ion source 55. In an alternative configuration, the neutron monitor 51 may be disposed proximate the target 53. However, this alternative configuration is less preferred because it might interfere with the high voltage insulation that is normally present here. To avoid this problem, the orientation of the neutron generator may be flipped; as shown in FIG. 8, and the target is operated at ground instead of being at a negative high voltage (about −115 kV).

Figure 8:
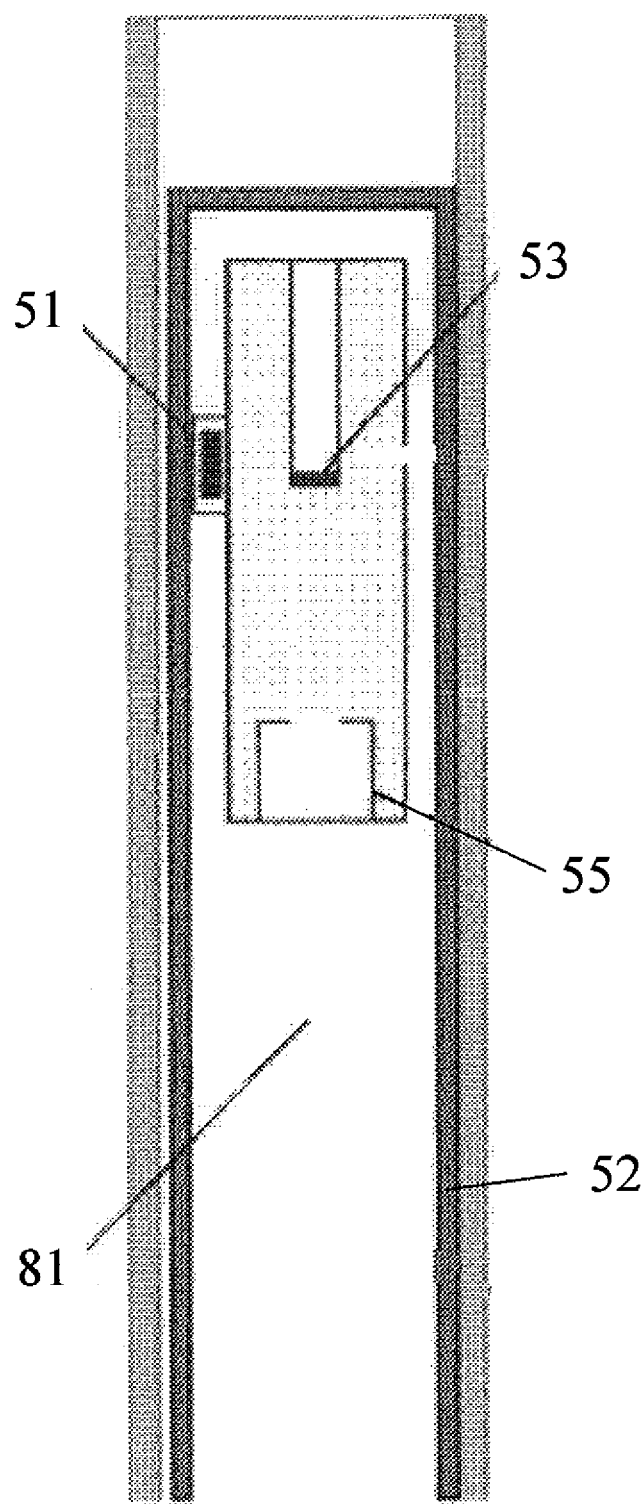
FIG. 8 shows another schematic of a nuclear tool having a solid-state neutron monitor in accordance with one embodiment of the invention.

FIG. 8 shows an embodiment of the invention, in which a solid state detector 51 is disposed inside the generator housing 52, but mounted radially from the target 53 instead of the ion source 55. In this configuration, both the neutron monitor 51 and the target 53 are located away from the high voltage section 81 and the target 53 is operated at ground potential. The operation of this neutron generator differs from the traditional setup because the ion source 55 is normally operated at ground potential and the target is operated at about −100 kV. However, in this invented generator configuration, the target 53 is operated at ground and the ion source 55 is operated at a positive high voltage (e.g., about +100 kV). The grounded target configuration, as shown in FIG. 8, is technically more challenging because it is necessary to operate and control the ion source at a high positive potential.

Figure 9:
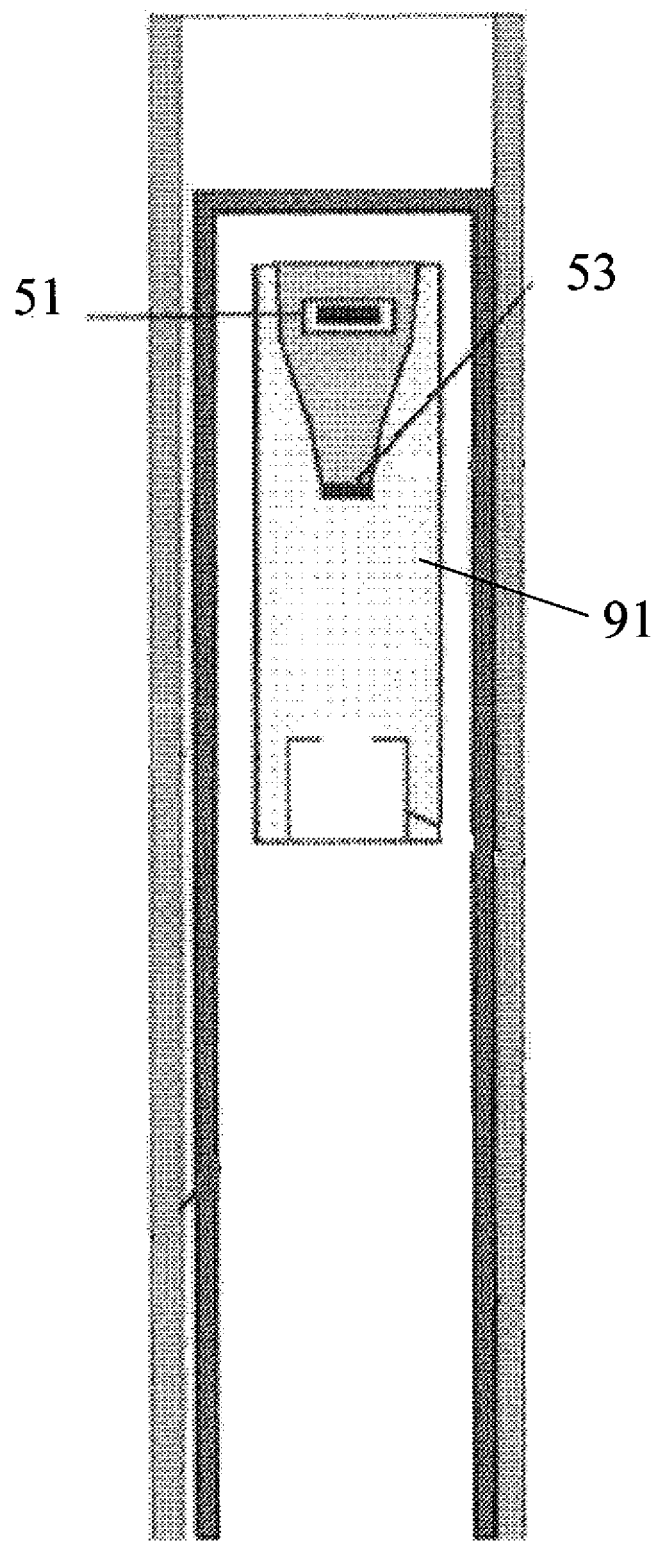
FIG. 9 shows another schematic of a nuclear tool having a solid-state neutron monitor in accordance with one embodiment of the invention.

FIG. 9 shows another configuration, in which the solid state detector 51 is integrated within the neutron generator vacuum tube 91 near the target 53. This configuration may be the most desirable because it will be convenient to place this neutron generator-monitor assembly in a tool. However, the neutron monitor for use in this configuration should be robust (e.g., radiation resistant) and reliable. Otherwise, the need to replace the neutron monitor will increase the costs or shorten the useable life of the neutron generator. Thus, this configuration is desirable, but may not be the most cost effective.

The above examples show some configurations that are possible with the small size solid-state neutron monitors. One of ordinary skill in the art would appreciate that these are for illustration only and other modifications and variations are possible without departing from the scope of the invention.

Figure 10:
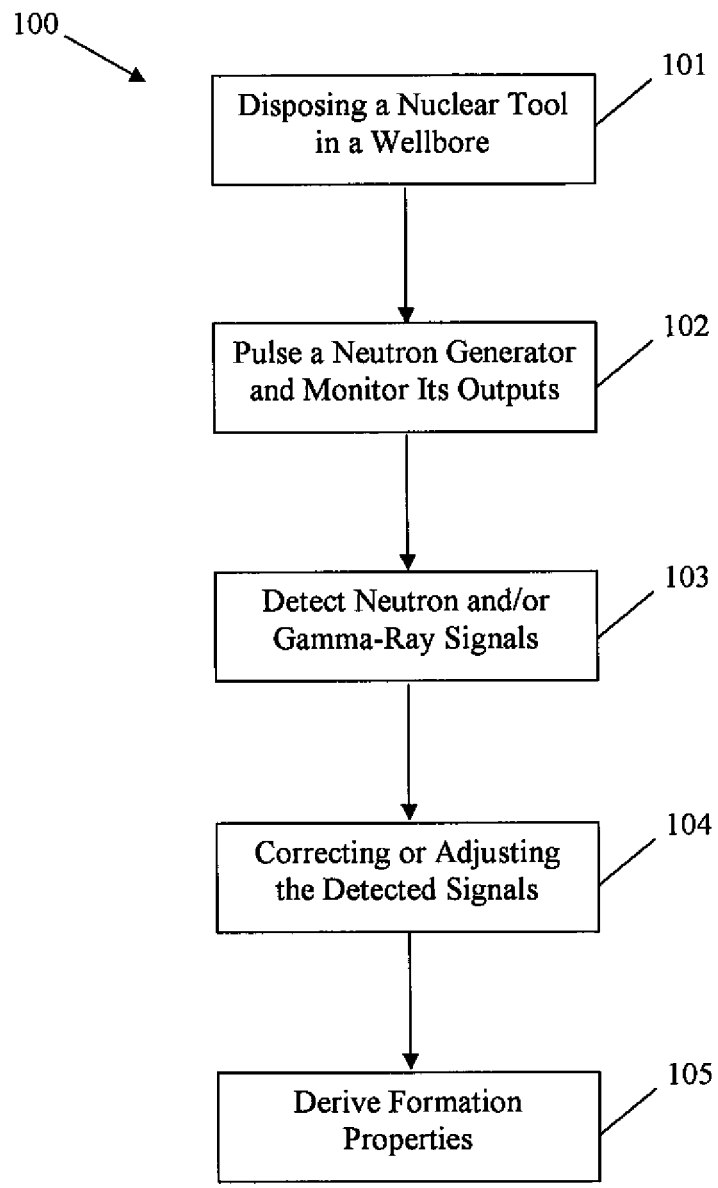
FIG. 10 shows a flow chart illustrating a method for formation logging in accordance with one embodiment of the invention.

Some embodiments of the invention relate to methods for logging the formations using a tool of the invention. As shown in FIG. 10, a method 100 in accordance with one embodiment of the invention includes disposing a nuclear tool in a wellbore penetrating a formation (step 101). The nuclear tool includes a d-D or a d-T neutron generator and a solid-state neutron monitor. The solid-state neutron monitor is disposed proximate the neutron generator to monitor the burst outputs of the neutrons. In addition, the nuclear tool may include one of more nuclear detectors, such as fast neutron detectors, epithermal neutron detectors, thermal neutron detectors, or gamma-ray detectors. Once the tool is lowered to the desired depth, the d-D or d-T neutron generator is pulsed to emit neutrons into the formation (step 102). The neutrons thus emitted may have energies of 2.4 MeV (from d-D neutron generator) or 14 MeV (from d-T generator). The outputs of the neutron pulse are monitored with the solid-state neutron monitor. After interactions with nuclei in the formations, these neutrons lose some of their energies and become epithermal or thermal neutrons. Some of these neutrons may also be captured by the nuclei in the formations. Such interactions may also generate gamma rays. The neutrons or gamma rays that return to the tool will be detected with one or more detectors (step 103). The detected signals may be adjusted (or corrected) for any variation in the neutron outputs as measured by the solid-state neutron monitor (step 104). Finally, such measurements may be used to determine various formation properties, such as formation slowing down time, formation porosity, formation neutron capture cross section, formation bulk density, or lithology of the formation (step 105).

Advantages of the invention may include one or more of the following. A neutron tool in accordance with embodiments of the invention includes a solid-state neutron monitor for accurately monitoring the outputs of the electronic source in the tool. The solid-state monitor has a small size and can be disposed close to the electronic neutron sources in various configurations without taking up precious space in the tool. The small sizes of the solid-state neutron monitors allow these monitors to be included inside the neutron generator housings. This would simplify the neutron tool manufacturing processes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A nuclear tool, comprising:
    a first housing configured to move in a wellbore penetrating a formation;
    a second housing disposed in the first housing and defining an opening;
    a neutron venerator disposed in the opening and comprising
        an ion source, and
        a target downstream of the ion source; and
    a solid-state neutron monitor disposed in the opening and positioned closer to the ion source than the target for monitoring substantially immediate outputs of the neutron generator, wherein said solid-state neutron monitor comprises a large band-gap material in the absence of a thermal neutron absorbing material, wherein said large band-gap material reacts with impinging radiation.

2. The nuclear tool of claim 1, wherein the semiconductor material comprises silicon carbide in the absence of a thermal neutron absorbing material.

3. The nuclear tool of claim 2, wherein said semiconductor material comprises a non-diamond semiconductor material and is produced by chemical vapor deposition.

4. The nuclear tool of claim 1, wherein the solid-state neutron monitor has a dimension of from 0.5 cm to 2 cm in diameter.

5. The nuclear tool of claim 1, wherein the solid-state neutron monitor is from 0.1 mm to 1 cm thick.

6. A method for constructing a nuclear tool, comprising:
    disposing a neutron generator in an opening defined by a second housing and comprising
        an ion source, and
        a target downstream of the ion source;
    disposing the second housing in a first housing; and
    disposing a solid-state neutron monitor in the opening and positioned closer to the ion source than the target for monitoring substantially immediate outputs of the neutron generator, wherein said solid-state neutron monitor comprises a large band-gap material in the absence of a thermal neutron absorbing material, wherein said large band-gap material reacts with impinging radiation.

7. The method of claim 6, wherein said semiconductor material comprises a non-diamond semiconductor material further comprising silicon carbide in the absence of a thermal neutron absorbing material.

8. A method for logging a formation, comprising:
disposing a nuclear tool in a wellbore penetrating the formation, wherein the nuclear tool comprises a first housing carrying a second housing, the second housing defining an opening carrying a neutron generator and a solid-state neutron monitor coupled to the neutron generator, the neutron generator comprising an ion source and a target downstream of the ion source;
generating neutrons from the neutron generator;
monitoring substantially immediate outputs of neutrons generated by the neutron generator using the solid-state neutron monitor positioned closer to the ion source than the target;
detecting signals generated from the neutrons traveling in the formation; and
correcting the detected signals, based on signal strength detected by the solid-state neutron monitor, to produce corrected signals,
wherein said solid-state neutron monitor comprises a large band-gap material in the absence of a thermal neutron absorbing material, wherein said large band-gap material reacts with impinging radiation.

9. The method of claim 8, wherein said semiconductor material comprises a non-diamond semiconductor material further comprising silicon carbide in the absence of a thermal neutron absorbing material.

10. The method of claim 8, further comprising deriving a formation property from the corrected signals.

11. A method for logging a formation according to claim 8 wherein the amount of radiation is measured by counting the single current pulses produced by neutrons interacting with the non-diamond semiconductor material.

* * * * *